METHOD FOR AUTOMATICALLY STOPPING THE DRIVE OF TAPE-TYPE RECORD CARRIERS

Filed Feb. 23, 1962

INVENTOR.
WiLLi Studer
BY Werner W. Kleeman
ATTORNEY

United States Patent Office 3,148,814
Patented Sept. 15, 1964

3,148,814
METHOD FOR AUTOMATICALLY STOPPING THE DRIVE OF TAPE-TYPE RECORD CARRIERS

Willi Studer, Althardstrasse 150, Regensdorf, Zurich, Switzerland

Filed Feb. 23, 1962, Ser. No. 174,976
Claims priority, application Switzerland Feb. 27, 1961
7 Claims. (Cl. 226—2)

The present invention broadly relates to an improved method and means for automatically stopping the drive of tape-type record carriers, particularly for magnetic tape recorders and reproducing apparatus or the like.

The driving arrangement for tape-type record carriers, especially for tape recorders, generally nowadays employed in practice are mostly provided with an apparatus which automatically switches-off the drive upon exhaustion or passage of the tape end, as well as when disruptions of the movement of the tape occurs. A large number of solutions to this problem are known, almost all of which are based upon influencing the position of a pivotable or movably mounted feeler roller, which upon exhaustion of the tape changes its position and intiates a switching operation. Furthermore, optical and electrical means have been employed which are responsive to color or metal markings provided on the sound carrier, or light barriers have been used by means of which, after exhaustion or passage of the tape or band end, there results transmission of a beam of light onto a photoelectric cell.

These known devices for switching-off the tape recorder drive have the disadvantage that they either require additional mechanical elements, such as levers provided with rollers or the like, which are not necessitated by the given requirements of the transport equipment, or else they do not respond when changes in the speed of movement of the tape or other disturbances during tape movement occur, in that the sound carrier, for example, in the case of a light barrier nonetheless disrupts a beam of light, or a lever arrangement bears against a stop in a direction opposite to the switching direction, and so forth. Such disturbances may occur because of badly executed tape splices, whereby the sound carrier follows a path of travel other than the normal one.

The improved method and device of the present invention for automatically stopping the drive of tape-type record carriers, especially tape recorders is featured by the provision of a freely rotatable roller which is driven by the moving tape and further drives means associated therewith in order to generate an electrical signal in the form of an alternating voltage or a series of pulses. The control factors such as the frequency of this electric signal is proportional to the speed of the tape or the rotational speed of the roller. Additionally, there is further provided means such as frequency depending means which are controlled by the previously mentioned signal in order to influence the tape drive.

This arrangement avoids the previously mentioned disadvantage in that stopping of the drive arrangement will always occur if the rotational speed of the roller driven by the tape perceivably changes, whereby there results the advantage that for this purpose there can be employed any roller for guiding the tape and no resiliently mounted additional levers or the like are necessary. With this arrangement which automatically responds to passing of the tape end or to mechanical trouble, there is only produced an electrical control signal during rotation of the roller which is driven by the tape, whose regulation or control factors change in the event of mechanical trouble in tape traction or when the tape is exhausted.

Numerous transducer principles are known which in their reciprocal action between a mechanically moved part and an electric switching element produce an electric voltage of variable frequency or another suitable signal of changing control or regulation factor which may be employed for the initiation of a stopping motion. Particularly suitable for this purpose are devices which produce a series of impulses or an alternating voltage, the frequency of which is proportional to the rotational speed of the roller member which is moved by means of the tape. As long as the roller member rotates normally, the thus produced direct or alternating voltage impulses exhibit a given reference frequency which is determined by the predetermined speed of the tape and the construction of the driving arrangement. A deviation from this defined frequency indicates the passage of the tape end or some other irregularity in tape traction. When the roller is in idle or stopped position, a zero frequency and a complete lack of a monitoring signal will be observed in the extreme case. Frequency responsive control members may be employed to trigger a stopping operation in a simple manner when a predetermined frequency value is not reached. The initiation of this stopping process is possible for example, by employing the lower frequency limit of an amplifier through the rapid drop in the output load with lower frequencies without necessitating particular additional means.

Accordingly, it is a primary object of the present invention to provide an improved method and means for reliably stopping the drive for a band or tape, particularly for tape recording and reproducing apparatus.

Another important object of the present invention is the provision of an improved system for automatically arresting the movement of a tape member in a highly reliable and accurate manner, with the mass of the rotating members being kept at a fairly small value.

A further important object of the present invention is the provision of an improved method and arrangement for stopping tape travel in response to a regulating signal which is indicative of tape exhaustion or deviation from proper tape movement.

Still a further important object of the present invention is the provision of improved means for generating a control signal for arresting tape travel, which is highly reliable in operation, free from mechanical failure, extremely economical and simple in construction, as well as being extremely durable.

Yet a further important object of this invention is improved method and means for controlling tape travel as a function of a control signal, the frequency of which drops below a reference value when improper tape movement occurs.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
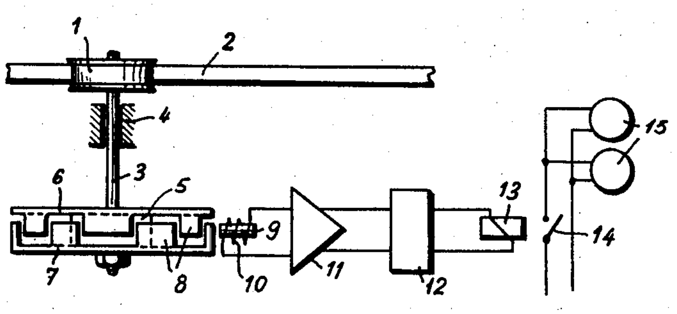
FIGURE 1 illustrates a first embodiment of an arrangement of the present invention, whereby the processing system for the control signal is schematically depicted.

Referring now to the drawings and, more particularly to FIGURE 1, where only enough of the recording apparatus structure is shown to enable one to understand the invention, there is shown by way of example a tape recorder which is provided with a freely rotatable tape guide roller 1 having lateral guiding flanges in a known manner. The roller 1 has imparted thereto a rotational movement as a result of the tape 2 passing around a part of its circumference. The shaft 3 of the guide roller 1 is supported in a bearing 4 and carries at the opposite side of this bearing a signal producing device consisting of a disk like permanent magnet 5 magnetized in the axial direction, and which is located between two toothed or serrated pole plates or shoes 6 and 7, so that the meshing or interengaging teeth 8 always display alternating polarity.

There is also provided a stationary receiving device, schematically shown as an iron core 9 provided with the winding 10 which supplies alternating voltage impulses during rotation of the plate members 6 and 7, the control factor such as its frequency is determined by the speed of the tape or the rotational speed and the number of poles of the serrated plates 6 and 7. During standstill no signal is induced in the winding 10. The alternating voltage impulses which are generated during normal tape movement are employed after amplification, for example, in a transistor amplifier 11 and after passing through a filter 12, to actuate a relay 13, whose contact 14 with the relay in excited condition connects the drive motor 15 for the tape to a suitable supply source (not shown). The frequency function of the filter arrangement 12 is designed such that signal frequencies below the correspondingly chosen reference frequency for normal tape movement are blocked. With undesired disturbance in the movement of the tape or passing of the tape end and the thus resulting falling-off of the frequency of the signal, the relay 13 will then be de-energized and the drive 15 for the tape 2 will thus be disrupted.

It is also possible to achieve arresting of the drive of the tape without the provision of a particular filter arrangement 12, in that the amplifier 11 is so constructed that the frequency of the control signal lies just above the lower frequency limit of the amplifier. As a result, the decreasing output load of the amplifier during a decreasing of the frequency of the signal, when a disturbance of the tape movement or tape breakage occurs, likewise results in an automatic switching-off of the drive of the tape.

In addition to the illustrated and described direct switching-off of the drive moor, other possibilities naturally exist for influencing the tape drive, for example actuation of an electro-mechanical coupling disposed between the motor and the drive roller for the tape, or an indirect triggering of the switching-off operation, perhaps in connection with a hand-operated release arrangement.

Figure 2:
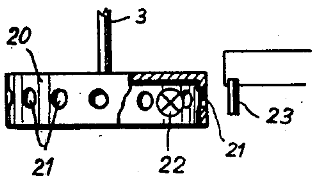
FIGURE 2 depicts an arrangement employing photoelectrical means for generating the control signal.

In FIGURE 2 there is shown an example of an electro-optical system for the production of control signals. On the shaft member 3 for the roller 1 there is located a perforated plate or disk 20 whose outer edge exhibits a plurality of apertures 21, preferably uniformly distributed thereabout. The perforated disk 20 moves between a stationary emitter lamp 22 and an oppositely arranged light sensitive switching element 23, for example, photoelectric cell, photo resistor, phototransistor, and so forth. During rotation of the perforated disk 20 as a result of the drive of the freely rotatable guide roller 1 by the tape member 2, the switching element 23 produces a series of electrical impulses, whose frequency is again proportional to the speed of the tape. This signal is processed in the manner as previously described with reference to the embodiment of FIGURE 1, for the purpose of automatically influencing the tape drive during decreasing impulse frequency. It is also possible with a corresponding arrangement of a light source and a light sensitive element to construct the tape guide roller 1 itself as a perforated disk, whereby a separate perforated plate 20 no longer becomes necessary, and there results an extremely simple arrangement.

Figure 3:
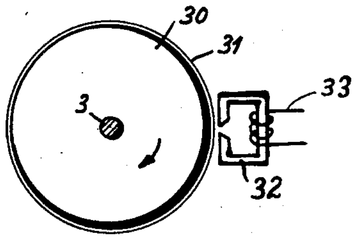
FIGURE 3 shows a further embodiment of the invention for generating a control signal by employing an endless tape strip.

A further possible arrangement for generating control signals is illustrated in the embodiment of FIGURE 3. In this arrangement the shaft 3 carries a plate member 30 formed from a non-magnetic material, the periphery of which is provided with a coating or covering 31 formed from a permanently magnetized material. This coating 31 can, for example, be formed from a strip of conventional magnetic tape, which may be pasted or otherwise bonded or secured to the circumference of the disk 30. The coating 31 is magnetized in a uniformly distributed manner with a sufficient number of poles. In the event of movement of the magnetic coating 31 in the immediate vicinity of the air gap of the schematically depicted magnetic pick-up head 32, there is induced in the induction winding 33 an alternating voltage the frequency of which is proportional to the speed of the tape and which, as described hereinabove, forms the control signal for automatically switching-off the drive mechanism when such falls below the reference frequency.

Such a construction possesses the advantage of permitting great ease of manufacture, since for example a magnetic tape may initially have recorded thereon a suitable sound frequency, such as a signal of constant frequency, which after having been cut to a suitable length can be pasted or otherwise applied to the disk 30. In this manner it is easy to maintain the mass of the rotating portions at a very small value which must remain below a determined limit, since the weight of the magnetic coating 31 is practically negligible and the carrying member or disk 30 may be formed from a light-weight material.

Finally it is to be mentioned that the rotational speed of the roller 1 which is driven by the tape 2 may, in all instances, be relatively small at the lowest standardized tape speeds, so that the number of magnetic poles must be fairly high in order to obtain a readily processable reference frequency. The number of poles can be readily adjusted to any useful value during magnetization of the coating 31 on the carrier disk 30. Additionally, this entails the structural advantage that the diameter of the carrier disk 30 may be chosen to be correspondingly small. Thus, also enabling the effects of inertia in the rotating parts to be further reduced. It is to be appreciated that with the embodiments of FIGURES 2 and 3, the generated electric signals may be processed and evaluated in the manner as described in FIGURE 1, for example.

The aforedescribed examples reveal some of the possible constructional embodiments for practising the teachings of the present invention. Of course, other solutions which will readily suggest themselves to those skilled in the art are possible, as for example by utilizing optical, electro-static or other electromechanical transducers, particularly useful where stray fields of magnetic devices should be avoided.

Having thus described the present invention what is desired to be secured by United States Letters Patent, is:

1. A method for automatically stopping the drive of tape-type record carriers, particularly for magnetic tape recorders and reproducing apparatus, comprising the steps of: generating electric signals which are a function of the rotational movement of a roller in contact with the tape, processing such electric signals to determine whether such tape is properly transported or exhausted, and employing those electric signals which are indicative of improper mechanical transport or exhaustion of the tape to stop the drive for said tape.

2. A method for automatically stopping the drive of tape-type record carriers, particularly for magnetic tape recorders and reproducing apparatus, comprising the steps of: generating electric signals possessing control factors which are a function of the rotational movement of a roller in contact with the tape, processing such electric signals to determine whether such tape is properly transported or exhausted, and employing those electric signals possessing control factors indicative of improper mechanical transport or exhautsion of the tape to stop the drive for said tape.

3. A method for automatically stopping the drive of tape-type record carriers, particularly for magnetic tape recorders and reproducing apparatus, comprising the steps of: generating electric signals possessing control factors which are a function of the movement of the tape, continually processing such electric signals to determine whether electric signals possessing desired control factors indicative of proper mechanical transport of the tape are present, and employing those electric signals possessing control factors other than the desired control factors and indicative of improper mechanical transport or exhaustion of the tape to stop the drive for said tape.

4. A method for automatically stopping the drive of tape-type record carriers, particularly for magnetic tape recorders and reproducing apparatus, comprising the steps of: displacing the tape to generate electric signals possessing desired control factors which are a function of the proper mechanical movement of the tape, continually evaluating such electric signals to determine whether the tape is being properly transported, and utilizing electric signals possessing control factors other than the desired control factors and corresponding to improper mechanical transport or exhaustion of the tape to arrest the drive for said tape.

5. A method for automatically stopping the drive of tape-type record carriers, particularly for magnetic tape recorders and reproducing apparatus, comprising the steps of: displacing the tape to generate electric signals possessing a desired frequency range which is a function of the proper mechanical movement of the tape, continually evaluating such electric signals to determine whether the tape is being properly transported, and utilizing electric signals other than of said desired frequency range corresponding to improper mechanical transport or exhaustion of the tape to arrest the drive for said tape.

6. A method for automatically stopping the drive of tape-type record carriers, particularly for magnetic tape recorders and reproducing apparatus, comprising the steps of: moving the tape within a predetermined speed range to generate electric signals possessing desired control factors which are a function of the proper mechanical movement of the tape, continually evaluating such electric signals to determine whether the tape is being properly transported, and utilizing generated electric signals possessing control factors other than said desired control factors and corresponding to improper mechanical transport or exhaustion of the tape to arrest the drive for said tape.

7. A method for automatically stopping the drive of tape-type record carriers, particularly for magnetic tape recorders and reproducing apparatus, comprising the steps of: displacing the tape to generate electric signals possessing a desired frequency range and above a reference frequency, to thereby indicate proper mechanical tape transport, continually processing such generated electric signals to evaluate whether the frequency thereof is above or below said reference frequency, and employing those electric signals which are below the reference frequency and corresponding to improper mechanical transport or exhaustion of the tape to arrest the drive for said tape.

References Cited in the file of this patent

UNITED STATES PATENTS

| | | |
|---|---|---|
| 1,976,355 | Mees et al. | Oct. 9, 1934 |
| 2,829,229 | Metz | Apr. 1, 1958 |
| 3,005,582 | Brede | Oct. 24, 1961 |
| 3,025,751 | Braun | Mar. 20, 1962 |